2,724,102

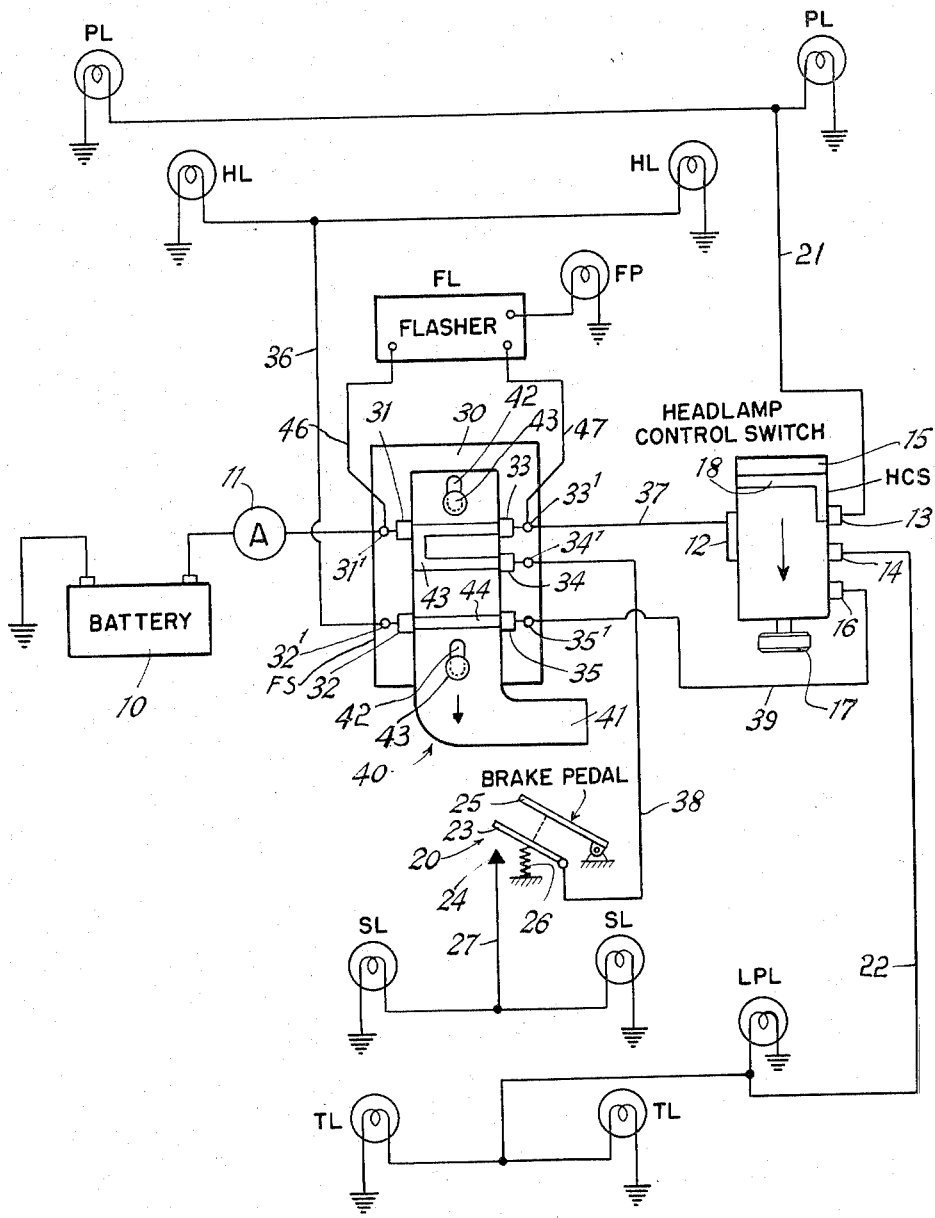

SIGNALLING SYSTEM

Jesse R. Hollins, Brooklyn, N. Y.

Application October 22, 1953, Serial No. 387,769

3 Claims. (Cl. 340—81)

This invention relates to signalling systems for automotive vehicles and, more particularly, to a simple, inexpensive and novel arrangement for selectively utilizing the usual vehicle night driving lamps as flashing, emergency stop warning lamps.

Automotive vehicles are customarily equipped with front-mounted headlamps and parking lamps and rear-mounted stop lamps, tail lamps, and one or more license plate lamps. The stop lamps are under the control of a brake-pedal operated switch, and the other lamps are under the control of a headlamp switch. The latter has an "off" position, a "parking lamps on" position, and a "headlamps on" position. In addition, many vehicles, but by no means all, are equipped with turn signalling lamp means under the control of a direction signal selector lever usually mounted on the steering column.

In accordance with the present invention, an emergency stop warning system is provided which is applicable to any vehicle equipped with a headlamp control switch and brake pedal controlled stop lamps. This arrangement comprises a two-position flare switch connectable between the vehicle source of electric energy, the headlamp control switch, the headlamps, and the brake-operated stop lamp switch.

This flare switch has an "off" position in which the headlamp switch is connected directly to the ammeter and headlamps, and the brake-operated switch directly to the ammeter, for conventional control operation of these switches. A flasher is connected between the ammeter and headlamp switch and is shunted by the flare switch in the "off" position of the latter, so that the high resistance flasher is inoperative under these circumstances. In the "on" position of the flare switch, this shunt is removed so that the input terminal of the headlamp switch is energized only through the flasher. At the same time, the brake-operated switch is disconnected from the ammeter and the headlamps are disconnected from the headlamp switch.

If the flare switch is moved to the "on" position and the headlamp switch placed in either "on" position, the tail lamps and license plate lamps are flashed and, in the "parking lamps on" position, the parking lamps are also flashed. The headlamps and stop lamps cannot be illuminated, as their circuits are broken at the flare switch. This cuts the possible load on the battery, compensating for the increased load due to the flasher, prevents overloading of the flasher, and prevents the brighter illumination of the stop lamps detracting from the flashing warning effect of the tail and license plate lamps.

For an understanding of the invention principles, reference is made to the following description of a typical embodiment thereof as illustrated in the accompanying drawing.

In the drawing, the single figure is a schematic wiring diagram of a vehicle lamp system embodying the invention signalling arrangement.

Referring to the drawing, the usual vehicle lamp system is illustrated as including front-mounted, grounded headlamps HL and parking lamps PL, and rear-mounted, grounded tail lamps TL, license plate lamp or lamps LPL, and brake-pedal controlled stop lamps SL. The lamps are selectively energized from the grounded vehicle battery 10 having an ammeter 11 in series therewith, battery 10 being, in the usual manner, connected in parallel with the vehicle generator (not shown).

Headlamps HL, parking lamps PL, tail lamps TL, and license plate lamp means LPL are selectively energized through a conventional headlamp control switch HCS. The switch HCS may be any one of several conventionally used types, all having an "off" position, a "parking lamps on" position, and a "headlamps on" position. The most commonly used types are a rotary drum switch and a pullout slide switch. For illustrative purposes, switch HCS is shown schematically as a pullout slide switch.

The switch HCS is illustrated as including an input terminal 12, a parking lamp terminal 13, a tail lamp and license plate lamp means terminal 14, and a headlamp terminal 16. The switch includes a dielectric slide 15 having an operating handle 17 and carrying a contact member 18. In the illustrated "off" position of switch HCS, contact 18 is disengaged from input terminal 12 and engaged only with parking lamp terminal 13, so that none of the driving or parking lamps can be energized. In the first "on" position of slide 15, contact 18 connects input terminal 12 to parking lamp terminal 13 and tail lamp and license plate lamp means terminal 14. In the second "on" position of slide 15, contact 18 connects input terminal 12 to terminal 14 and to headlamp terminal 16, being disengaged from parking lamp terminal 13.

A conductor 21 connects terminal 13 directly to parking lamps PL, and a conductor 22 connects terminal 14 directly to tail lamps TL and license plate lamp means LPL so that, in the first "on" position of slide 15, lamps PL, TL and LPL will be connected to input terminal 12 and, in the second "on" position of slide 15, lamps TL and LPL will be connected to input terminal 12. In the usual arrangement, input terminal 12 is connected directly to ammeter 11, and headlamp terminal 16 is connected directly to headlamps HL so that, in the second "on" position of slide 15, headlamps HL would also be connected to input terminal 12.

Stop lamps SL are controlled by a normally open switch 20 connected for operation by brake pedal 25. Brake-operated switch 20 includes an arm 23 operatively interconnected to brake pedal 25 and a contact 24 engaged by arm 23 when brake pedal 25 is depressed to apply the vehicle brakes. A spring 26 biases arm 23 to the open position. A conductor 27 connects contact 24 to stop lamps SL. Normally, arm 23 is connected directly to ammeter 11 so that lamps SL are energized whenever pedal 25 is depressed. Of course, the respective connections to arm 23 and contact 24 can be reversed without altering the control of lamps SL by switch 20.

In accordance with the invention, a "flare" switch FS is interposed between ammeter 11 and switches HCS and 20, and between switch HCS and headlamp HL. Switch HCS includes a preferably dielectric base 30 on which is slidably mounted a dielectric lever or slide 40 having a control handle 41. For example, slide 40 may be formed with aligned short slots 42 receiving headed studs 43 secured to base 30.

Base 30 is provided with contacts 31—35 on either side of slide 40 respectively engageable with contact members 43 and 44 carried by the slide. Each contact 31—35 is connected to an associated terminal 31'—35' on base 30. Terminal 31' and contact 31 are connected to ammeter 11, so that tap 31 may be termed the "input" contact of flare switch FS. A conductor 36 connects terminal 32' and contact 32 to headlamp HL. Tap 33 and terminal 33' are connected, by a conductor 37, to input terminal 12 of headlamp control switch HCS. A conductor 38 connects contact 34 and terminal 34' to the arm 23 of brake operated switch 20, and a conductor 39 connects contact 35 and terminal 35' to headlamp terminal 16 of control switch HCS. Conductors 46 and 47 connect a flasher FL across the input terminal 31' and the output terminal 33' of flare switch FS.

In the illustrated "off" position of slide 40 of switch FS, the contact member 43, which is U-shape in plan, connects input contact 31 to output contacts 33 and 34, and contact member 44 interconnects headlamp contacts 32 and 35. In this position of switch FS, input terminal 12 of headlamp control switch HCS, and brake-operated switch 20, are connected to ammeter 11. Thereby, switch HCS can be operated to selectively energize lamps PL, TL, LPL, and HL in the usual manner, and lamps SL are energized whenever brake pedal 25 is operated. The vehicle lamp system thus operates in the usual or normal manner.

Under these conditions, with slide 40 in the "off" position, flasher FL will not operate as the relatively high resistance flasher circuit is shunted by the low resistance contact 43 interconnecting lamps 31 and 33. Flasher FL is illustrated as including a flare pilot lamp FP which is flashed whenever the flasher is operating.

To signal an emergency stop or emergency warning, slide 40 of flare switch FS is pulled downwardly and headlamp switch HCS moved to either of its "on" positions. In the "on" position of flare switch slide 40, contact 43 is disengaged from contacts 31, 33 and 34, and contact 44 disengages contacts 32 and 35. The shunt around flasher FL is thus removed, brake-operated switch 20 is disconnected from ammeter 11, and headlamps HL are disconnected from control switch HCS.

Input terminal 12 of switch HCS is now intermittently energized by virtue of being connected to ammeter 11 only through flasher FL. If switch HCS is in its first "on" position, parking lamps PL, tail lamps TL and license plate lamp means LPL will thus be flashed. In the second "on" position of switch HCS, only lamps TL and LPL will be flashed, as the circuit for headlamps HL is interrupted by flare switch FS.

With switch FS in the "on" position, headlamps HL and stop lamps SL cannot be energized, as their energizing circuits are open at flare switch FS. This not only prevents an excessive loading of battery 10, whose load is increased by operation of flasher FL, but also prevents the relatively brighter, steady illumination of stop lamps SL from detracting from the warning effect of lamps TL and LPL which are now being flashed. This enhances the warning value of the flashing, rear-mounted lamps TL and LPL.

The invention thus provides an inexpensive and easily installed arrangement for selectively converting the usual or conventional vehicle lamp system into a flare warning arrangement without imposing an excessive drain on the battery.

While a specific embodiment of the invention has been shown and described in detail to illustrate the application of the invention principles, it will be understood that the invention may be embodied otherwise without departing from such principles.

What is claimed is:

1. In an automotive vehicle having a source of electric energy, rear mounted night marker and driving lamps, a headlamp control switch controlling energization of said rear mounted night marker and driving lamps, stop lamps, and a brake pedal operated switch connected in series with said stop lamps; an emergency stop warning arrangement comprising, in combination, a flasher connected in series between the source of energy and the control switch; and a flare switch connected in series between the source of energy and the control switch and between the source of energy and the brake-operated switch, and in parallel with said flasher; said flare switch having a first position shunting said flasher for steady illumination of said lamps under the control of said control switch, and connecting the brake-operated switch to the source of energy, and a second position removing the shunt from said flasher for energization of said control switch through said flasher for flashing illumination of said lamps, and disconnecting the brake-operated switch from the source of energy.

2. In an automotive vehicle having a source of electric energy, headlamps, parking lamps, tail lamps, license plate lamp means, a headlamp control switch in circuit relation with such lamps and operable to selectively connect the lamps to the vehicle source of energy, stop lamps, and a brake pedal operated switch connected in series with said stop lamps; an emergency stop warning arrangement comprising, in combination, a flasher connected in series between the source of energy and the control switch; a flare switch connected in parallel with said flasher; said flare switch having a first position shunting said flasher to connect said control switch directly to the source of energy and a second position removing the shunt from said flasher to connect said control switch to the source of energy in series with said flasher; said flare switch being connected between such brake-operated switch and the source of energy and, in such first position, connecting such brake-operated switch to such source and, in such second position, disconnecting such brake-operated switch from said source.

3. In an automotive vehicle having a source of electric energy, headlamps, parking lamps, tail lamps, license plate lamp means, a headlamp control switch in circuit relation with such lamps and operable to selectively connect the lamps to the vehicle source of energy, stop lamps, and a brake pedal operated switch connected in series with said stop lamps; an emergency stop warning arrangement comprising, in combination, a flasher connected in series between the source of energy and the control switch; a flare switch connected in parallel with said flasher; said flare switch having a first position shunting said flasher to connect said control switch directly to the source of energy and a second position removing the shunt from said flasher to connect said control switch to the source of energy in series with said flasher; said flare switch being connected between said control switch and the headlamps and between such brake-operated switch and the source of energy and, in such first position, connecting the headlamps to the control switch and such brake-operated switch to such source and, in such second position, disconnecting the headlamps from the control switch and such brake-operated switch from such source.

References Cited in the file of this patent
UNITED STATES PATENTS

| | | |
|---|---|---|
| 2,102,288 | Smith | Dec. 14, 1937 |
| 2,458,323 | Volker | Jan. 4, 1949 |
| 2,578,284 | Bowman | Dec. 11, 1951 |
| 2,666,870 | Levy | Jan. 19, 1954 |